United States Patent
Chen et al.

(10) Patent No.: US 10,861,421 B2
(45) Date of Patent: Dec. 8, 2020

(54) ADAPTIVE CONTROL OF GPU RENDERED FRAME QUALITY

(71) Applicant: MediaTek Inc., Hsinchu (TW)

(72) Inventors: Chiung-Fu Chen, Hsinchu (TW); Kuo-Yi Wang, Hsinchu (TW); Cheng-Che Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/403,491

(22) Filed: May 3, 2019

(65) Prior Publication Data

US 2020/0105228 A1 Apr. 2, 2020

Related U.S. Application Data (60) Provisional application No. 62/737,221, filed on Sep. 27, 2018.

(51) Int. Cl.
| | |
|---|---|
| G09G 5/36 | (2006.01) |
| G06T 1/20 | (2006.01) |
| G06T 1/60 | (2006.01) |
| G09G 5/373 | (2006.01) |

(52) U.S. Cl.
CPC ............... *G09G 5/363* (2013.01); *G06T 1/20* (2013.01); *G06T 1/60* (2013.01); *G09G 5/373* (2013.01); *G09G 2320/0252* (2013.01); *G09G 2320/0261* (2013.01); *G09G 2320/10* (2013.01); *G09G 2340/0435* (2013.01); *G09G 2360/12* (2013.01)

(58) Field of Classification Search
CPC ......... G06T 17/20; G06T 15/00; G06T 15/04; G06T 2210/36; G09G 5/391
See application file for complete search history.

(56) References Cited

U.S. PATENT DOCUMENTS

| | | | | |
|---|---|---|---|---|
| 9,303,989 | B2* | 4/2016 | Nehmadi | G01C 11/06 |
| 2004/0066384 | A1* | 4/2004 | Ohba | G06T 15/20 |
| | | | | 345/419 |
| 2008/0084581 | A1* | 4/2008 | Kobayashi | H04N 5/23245 |
| | | | | 358/1.16 |
| 2012/0163580 | A1* | 6/2012 | Fujita | H04M 9/082 |
| | | | | 379/406.1 |
| 2014/0015995 | A1* | 1/2014 | Campbell | G06T 1/20 |
| | | | | 348/222.1 |
| 2014/0146877 | A1* | 5/2014 | Delegue | H04N 21/23435 |
| | | | | 375/240.02 |
| 2014/0247344 | A1* | 9/2014 | Fujiwara | H04N 5/23212 |
| | | | | 348/139 |
| 2015/0312572 | A1* | 10/2015 | Owen | H04N 19/102 |
| | | | | 375/240.02 |

(Continued)

FOREIGN PATENT DOCUMENTS

TW 201611617 A 3/2016

*Primary Examiner* — Todd Buttram
(74) *Attorney, Agent, or Firm* — Tong J. Lee (57) ABSTRACT

A stable frame rate is maintained by a system that includes a graphics processing unit (GPU). The system also includes memory to store frames rendered by the GPU, and a display to display the frames rendered by the GPU. In response to a negative indication with respect to the GPU maintaining a frame rate at an operating frequency, the GPU is operative to reduce frame quality of subsequent frames while maintaining the operating frequency.

20 Claims, 5 Drawing Sheets

(56) References Cited

U.S. PATENT DOCUMENTS

| | | | |
|---|---|---|---|
| 2016/0063760 A1* | 3/2016 | Woo | G06T 17/20 |
| | | | 345/423 |
| 2017/0078718 A1* | 3/2017 | Ioffe | H04N 21/2743 |
| 2018/0095522 A1* | 4/2018 | Huang | G06F 11/3024 |
| 2018/0174359 A1 | 6/2018 | Chen et al. | |
| 2018/0284872 A1* | 10/2018 | Schluessler | G06F 1/3265 |
| 2019/0120926 A1* | 4/2019 | Ge | G01S 5/02 |

* cited by examiner

ADAPTIVE CONTROL OF GPU RENDERED FRAME QUALITY

CROSS-REFERENCE TO RELATED APPLICATIONS

This application claims the benefit of U.S. Provisional Application No. 62/737,221 filed on Sep. 27, 2018, the entirety of which is incorporated by reference herein.

TECHNICAL FIELD

Embodiments of the invention relate to the control of frame quality rendered by a graphics processing unit (GPU).

BACKGROUND

In computer graphics, rendering is the process of producing images on a display device from descriptions of graphical objects or models. A graphics processing unit (GPU) renders graphical objects, which is often represented by a combination of primitives such as points, lines, polygons, and higher order surfaces, into picture elements (pixels). A GPU typically includes a rendering pipeline to perform the rendering operations. A rendering pipeline includes the following main stages: (1) vertex processing, which processes and transforms the vertices (which describe the primitives) into a projection space, (2) rasterization, which converts each primitive into a set of pixels, which are aligned with the pixel grid on the display device with attributes such as position, color and normal, (3) fragment processing, which processes each individual pixel by combining material properties, textures, lights, and other parameters of the pixel, and (4) output processing, which combines the pixels of all primitives into the display space.

A GPU outputs a sequence of rendered images (referred to as "frames") at a given frame rate (i.e., the number of frames per second, a.k.a. "FPS"). When a GPU is overloaded, some frames may fail to be rendered within a frame time budget and may be dropped before reaching the display. Frame dropping often causes graphics contents to stutter and pause on the screen, which in computing is referred to as "jank." Even a small amount of jank can negatively impact a user's experience. Therefore, there is a need for improving the frame rendering design in a graphics system.

SUMMARY

In one embodiment, a system is provided for maintaining a stable frame rate. The system comprises a graphics processing unit (GPU); memory to store frames rendered by the GPU; and a display to display the frames rendered by the GPU. In response to a negative indication with respect to the GPU maintaining a frame rate at an operating frequency, the GPU is operative to reduce frame quality of subsequent frames while maintaining the operating frequency In another embodiment, a method is provided for maintaining a stable frame rate. A negative indication is detected with respect to the GPU maintaining a frame rate at an operating frequency. In response to the negative indication, reducing frame quality of subsequent frames while maintaining the operating frequency.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for dynamically adjusting the frame quality rendered by a GPU to maintain a stable frame rate. The system may include one or more GPUs, memory and a display. Each GPU and the frames generated by the GPU are evaluated to assess whether the frames are rendered, or will be rendered, at a stable rate. The system may be set up such that the GPU is given a frame time budget to render a frame. The frames that cannot meet the frame time budget are dropped. If it is detected that the GPU fails to maintain a frame rate; e.g., the number of dropped frames exceeds a threshold, the GPU may reduce the frame quality of the subsequent frames. Reducing the frame quality reduces GPU loading, thereby allowing each of subsequent frames to meet the frame time budget and maintaining the frame rate (i.e., frame per second (FPS)) at a stable rate to enhance user experience.

Figure 1:
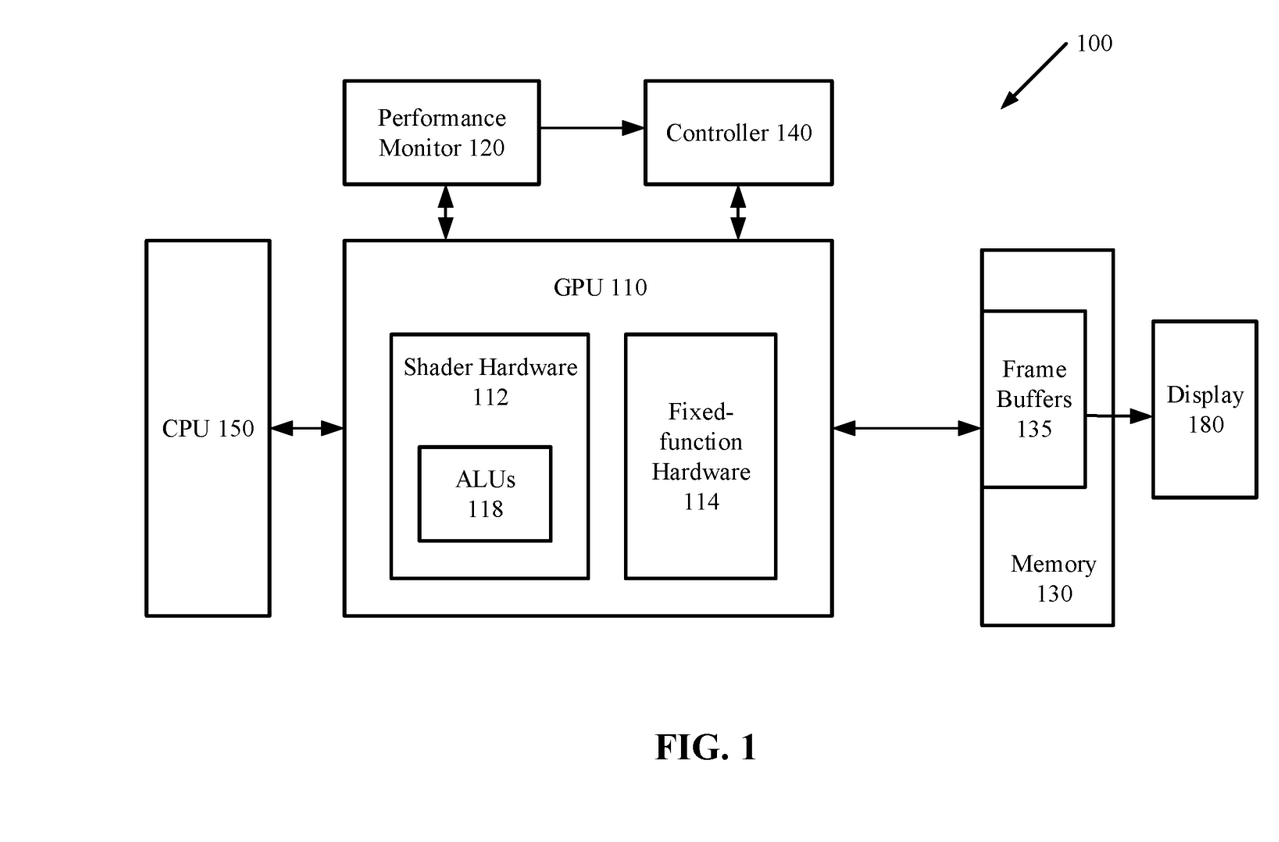
FIG. 1 illustrates a system in which embodiments of the invention may operate.

FIG. 1 illustrates a system 100 in which embodiments of the invention may operate. The system 100 includes a GPU 110, a memory 130 and a display 180. Furthermore, the system 100 includes a central processing unit (CPU) 150, which serves as a host executing software to assign tasks to the GPU 110 and other hardware components in the system 100. The CPU 150 may issue commands to the GPU 110 to direct the GPU 110 to perform graphics computations. The illustration of the system 100 has been simplified to show only one GPU and one CPU; it is understood that system 100 may include multiple CPUs and multiple GPUs, as well as additional hardware components.

In one embodiment, the GPU 110 performs graphics processing; e.g., creating 2D rasterized representations of 3D scenes, as well as general processing tasks. The GPU 110 includes a combination of fixed-function hardware 114 tailored for speeding up graphics computations, and shader hardware 112 for programmable graphics processing as well as general-purpose programmable computations. In some embodiments, the shader hardware 112 may include an array of arithmetic and logic units (ALUs) 118 operative to perform parallel computations. The shader hardware 112 and the fixed-function hardware 114 together perform pipeline graphics processing, such as vertex shader, rasterization, fragment shader, and post-processing.

In some embodiments, the CPU 150 and the GPU 110 may be integrated into a system-on-a-chip (SoC) platform. In one embodiment, the SoC platform may be part of a mobile computing and/or communication device (e.g., a smartphone, a tablet, a laptop, a gaming device, a wearable device, etc.), a desktop computing system, a server computing system, or a cloud computing system.

After a frame is rendered, the GPU 110 sends the rendered frame to frame buffers 135 in the memory 130. The memory 130 may be dynamic random access memory (DRAM), or other volatile or non-volatile memory. The display 180 displays the rendered frames in the frame buffers 135 at a refresh rate. If the frame rate goes above the refresh rate, the excess frames may be queued for their turn to be displayed, or may not be displayed at all.

In one embodiment, the system 100 includes a performance monitor 120 and a controller 140 to maintain the FPS at a stable rate. The performance monitor 120 may include one or more hardware and software components within the CPU 150, within the GPU 110 or elsewhere in the system 100 for monitoring GPU loading, GPU graphics processing indices and system conditions. The controller 140 may include one or more hardware or software components within the CPU 150, within the GPU 110 or elsewhere in the system 100. In one embodiment, the system 100 reduces frame quality when there is a negative indication with respect to the GPU 110 maintaining a frame rate at a predetermined operating frequency. The term "negative indication" herein refers to information that shows the GPU 110 fails or is about to fail to maintain the frame rate at the predetermined operating frequency. The negative indication may include GPU loading exceeding a threshold, or is expected to exceed a threshold (e.g., due to a high-density frame content). In monitoring the GPU loading, the performance monitor 120 may gather the following GPU information or a subset thereof, such as counting the dropped frames, estimating the time for rendering a frame, and conditions that may cause GPU overload and/or dropped frames. The GPU information gathered by the performance monitor 120 may be provided to the controller 140.

In addition to the GPU information, the controller 140 may receive system conditions such as system states and/or statistics from system software and hardware in determining whether to reduce frame quality for maintaining a stable FPS. For example, the system 100 may experience thermal throttling, may enter a power saving mode or may operate in a sustained performance mode, and reduction of GPU loading in these scenarios can be helpful to power and performance management. Reduction of GPU loading may be achieved by reducing frame quality. Thus, in one embodiment, the GPU 110 may determine, or the controller 140 may direct the GPU 110, to reduce frame quality based on not only the GPU information but also the system conditions such as the aforementioned system states and/or statistics.

In one embodiment, one of multiple options may be chosen for reducing frame quality. Examples of the options include, but are not limited to, reduced resolution, a different texture filter, reduced texture filtering level of detail (LOD), reduced precision in ALU computations, etc. Choosing any one of these options can reduce GPU loading. During GPU operation, the system 100 (e.g., the performance monitor 120) may collect a number of graphics processing indices, such as memory data movement (which indicates the amount of traffic on the memory bus), texture filtering processing load, shader processing load, etc. Different graphics processing indices indicate the amount of loading on different parts of the system 100. If any of the graphics processing indices exceeds its predetermined threshold, the controller 140 may choose an option to reduce that index. For example, if the texture filtering processing load exceeds a threshold, the GPU 110 may replace its texture filter with a less complex filter that requires less GPU computation, such as a bilinear texture filter, or to reduce the texture filtering level of detail (LOD). Reducing the texture filtering complexity and/or LOD not only reduces GPU computations, but also reduces memory bus traffic, as there is less data movement on the memory bus for retrieving texture filtering data from the memory 130. If the shader processing load exceeds its threshold, the GPU 110 may reduce the precision of the ALUs 118; e.g., by reducing the number of bits used to represent each number. If all of these graphics processing indices exceed their respective thresholds, or more than a predetermined number of the graphics processing indices exceed their respective thresholds, the GPU 110 may reduce the resolution in the subsequent frames. Reducing the resolution allows the GPU 110 to process fewer pixels in each frame and therefore can reduce all of the graphics processing indices at once.

In one embodiment, the change in resolution, texture filtering and ALU precision may be adaptive; if after the frame quality reduction it is detected that there is consistently unused frame time budget in each frame, then the GPU 110 may restore the resolution, texture filtering and/or ALU precision to thereby restore the frame quality.

In some embodiments, the frame buffers 135 may include two buffers (also referred to as double buffering) such that when a first buffer is filled by the GPU 110, the frame in a second buffer is transmitted to the display 180. Some current graphics systems use triple buffering; that is, three buffers such that a GPU can use one extra frame time (compared to double buffering) to draw a rendered frame. However, when the GPU produces frames at a stable rate that substantially matches the display refresh rate, then the triple-buffering design adds unnecessary delay to the frame display process. Thus, in the aforementioned embodiments where frame quality is adjusted to maintain a stable FPS, the system 100 may use two buffers, instead of three buffers, in the frame buffers 135 to reduce delay. In one embodiment, when the FPS has reached a stable rate and is above a threshold (which substantially matches the display refresh rate), the controller 140 may disable one of the three buffers in the frame buffers 135 to convert triple buffering to double buffering of the rendered frames for the display 180.

Figure 2:
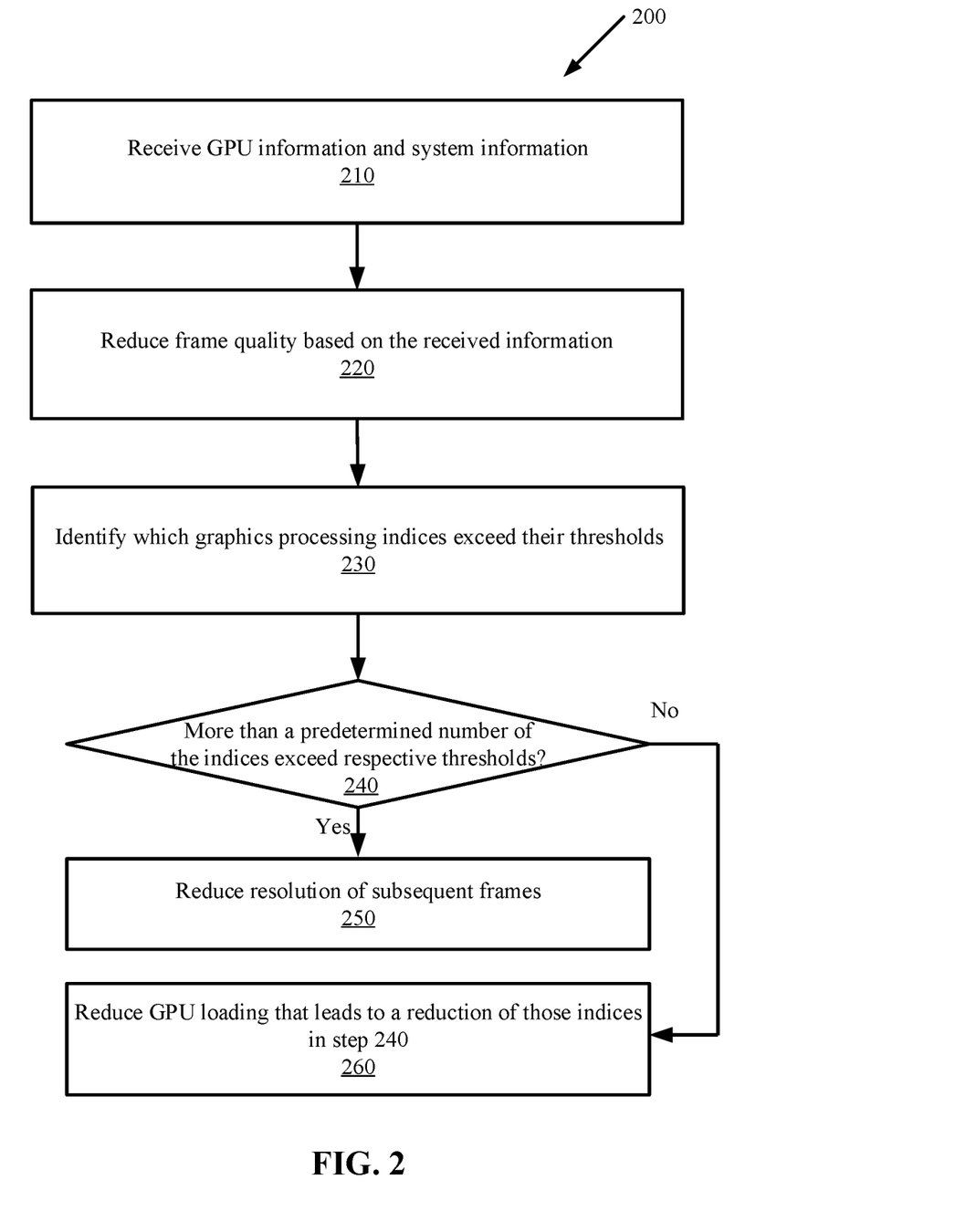
FIG. 2 is a flow diagram illustrating a frame quality control process according to one embodiment.

FIG. 2 is a flow diagram illustrating a method 200 for managing frame quality according to one embodiment. The method 200 may be performed by the system 100 of FIG. 1. The method 200 begins at step 210 when the controller 140 receives GPU information and system information, which may indicate the GPU loading. The GPU information may include an actual or estimated number of frames unable to meet the frame time budget. The system information may include thermal throttling and system state (e.g., in power saving mode or sustained performance mode), which may indicate that the GPU 110 needs to reduce its loading. The GPU 110 at step 220 determines or is directed (e.g., by the controller 140) to reduce frame quality based on the information. The GPU 110 at step 230 identifies which graphics processing indices exceed their respective thresholds. If more than a predetermined number (e.g., all) of the graphics processing indices exceed their respective thresholds at step 240, the GPU 110 reduces the resolution of each subsequent frame at step 250. If one or more (e.g., less than all, or no more than the predetermined number) of the graphics processing indices exceed their respective thresholds at step 240, the GPU 110 reduces the GPU loading that leads to a reduction of those indices (which exceeds their thresholds at step 240) in the subsequent frames at step 260. For example, if the shader processing load exceeds its predetermined threshold, the GPU 110 may reduce the ALU precision; if the texture filtering processing load exceeds its predetermined threshold, the GPU 110 may change the texture filter to a bilinear filter or reduce the filter LOD.

In one embodiment, the GPU 110 may execute multiple tasks in rendering a frame. Some of the tasks may consume more of the frame time budget than others. For example, if a given task consumes 80% of the frame time budget while the rest consumes only 20%, the GPU 110 may reduce the computations of the given task (which is the most-time-consuming task among all tasks executed by the GPU 110). The GPU 110 may monitor the processing time of each task to determine which task to reduce the computations.

Figure 3:
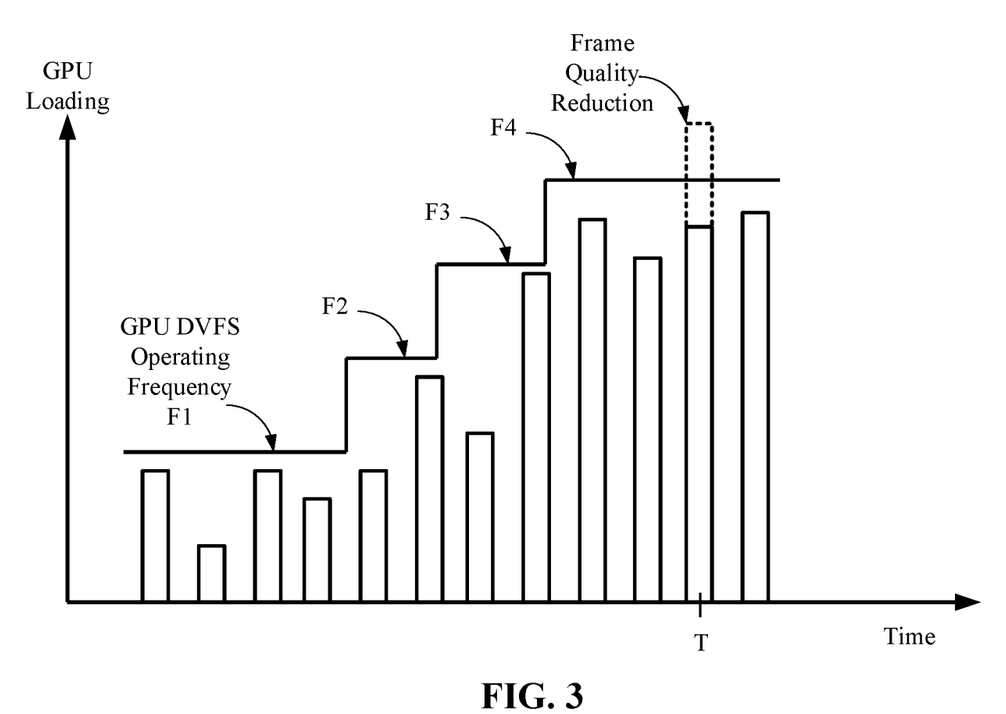
FIG. 3 is a diagram illustrating frame quality control in connection with GPU loading and operating frequencies according to one embodiment.

FIG. 3 is a diagram illustrating frame quality control in connection with GPU loading and operating frequencies according to one embodiment. As GPU loading increases, the system 100 may perform Dynamic Voltage Frequency Scaling (DVFS) to increase the operating frequency of the GPU 110 to thereby meet the demand of the workload. In the diagram of FIG. 3, the height of the rectangular bars represent the amount of GPU loading, and the GPU loading is bounded by the GPU DVFS operating frequency. When a predetermined operating frequency is reached, the system 100 may reduce the frame quality generated by the GPU 110 and maintain the predetermined operating frequency. For example, the system 100 when operating in power saving mode or sustained performance mode (e.g., for long-running applications) may be bounded by a predetermined operating frequency, and, as the GPU loading increases, may reduce frame quality without exceeding the predetermined operating frequency. As shown in the example of FIG. 3, the GPU loading bounded by the operating frequency F4 may exceed its bound at time T. To avoid dropping frames or other negative performance impacts, the GPU 110 reduces the frame quality at time T to lower its loading while maintaining the same operating frequency F4. The GPU 110 may restore the frame quality when its loading reduces to a predetermined level such that the GPU loading stays within the bound imposed by F4.

Figure 4A:
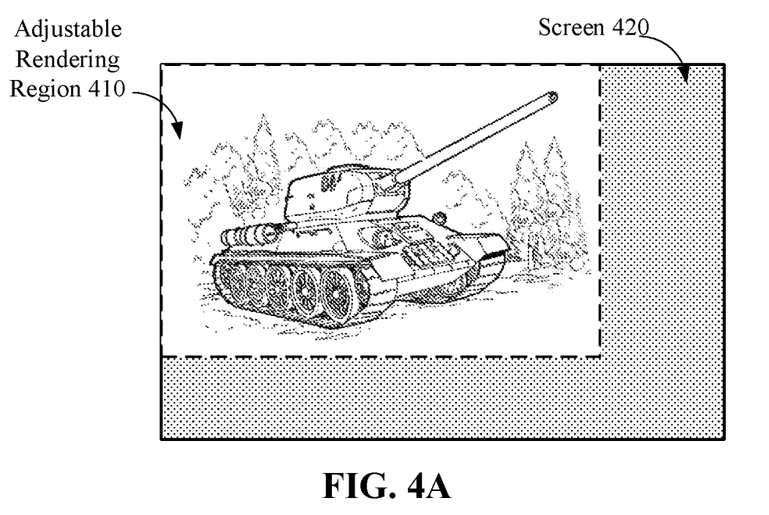
FIG. 4A and FIG. 4B illustrate examples of dynamic resolution reduction according to some embodiments.
Figure 4B:
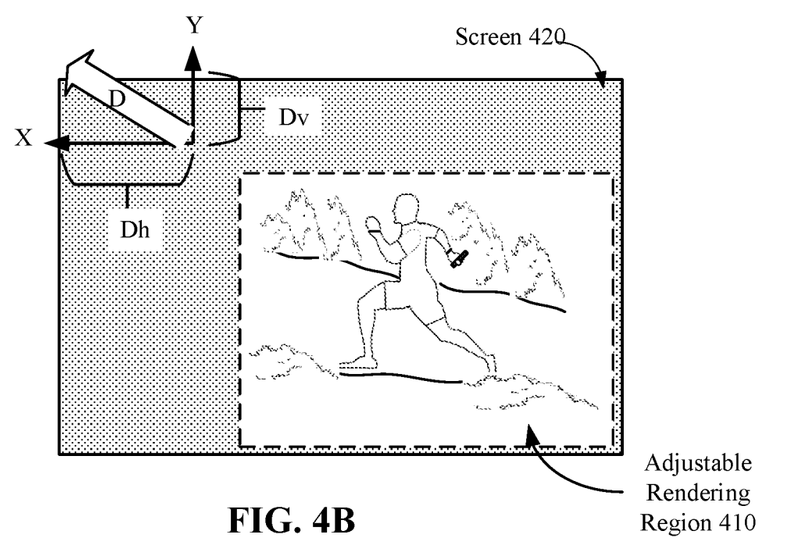

FIG. 4A and FIG. 4B illustrate examples of dynamic resolution reduction according to some embodiments. Referring again to the GPU 110 of FIG. 1, the GPU 110 in operation may detect that the frame to be rendered has a high-density content; e.g., a content with a large number of objects and/or with a high degree of details. The detection may be made from the input description of the graphical objects to be rendered, increased processing load of the shader hardware, and/or the increased memory bus traffic, etc. In one embodiment, the detection alone, or in conjunction with the graphics processing indices, may be used to determine whether to reduce the resolution of the subsequent frames. In one embodiment, the GPU 110 may reduce the resolution of the high-density frame content by rendering the frame into an adjustable rendering region 410 in the memory 130. For example, the rendering region 410 may be adjusted to occupy 80% of the entire screen 420. The smaller rendering region 410 (as compared to the size of the screen 420) takes less processing work for the GPU 110 because fewer pixels are generated. A display controller may then scale the content in the rendering region 410 to the full display size (i.e., the entire screen 420) with reduced resolution; e.g., 80% of the original resolution. The adjustment of the resolution may be dynamic during the GPU 110 operation based on the frame content.

In the example of FIG. 4B, the frame resolution is reduced along the direction of content movement; e.g., the camera may be following a moving subject (e.g., a moving person) and the frame resolution can be reduced along that movement direction. For example, a first-person shooter game may contain a frame sequence which captures a person moving in a given direction. If the given direction is horizontal in the frame to be rendered, then the frame resolution in the horizontal direction can be reduced. If the given direction is vertical in the frame to be rendered, then the frame resolution in the vertical direction can be reduced. If the given direction (e.g., the direction D in FIG. 4B) contains both a horizontal component Dh and a vertical component Dv, then the frame resolution can be reduced in both horizontal and vertical directions. The amount of reduction in the horizontal and vertical directions may be weighted according to the size (or length) of the horizontal component and the vertical component; for example, if Dh has length Lh and Dv has length Lv, then the resolution reduction along Dh may be weighted Lh and along Dv may be weighted Lv.

Figure 5:
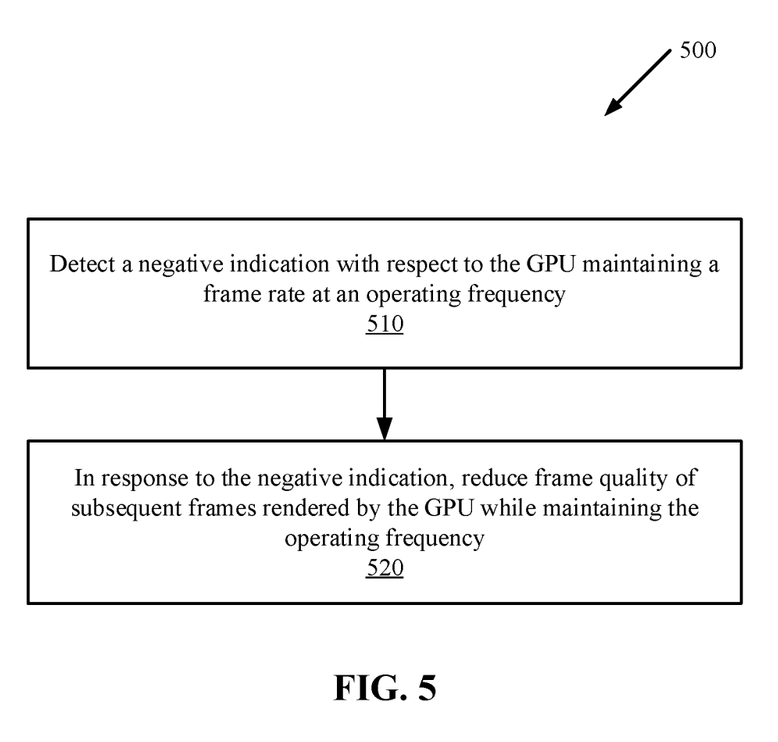
FIG. 5 is a flowchart illustrating a method for maintaining a stable frame rate according to one embodiment.

FIG. 5 is a flowchart illustrating a method 500 performed by a system for maintaining a stable frame rate according to an embodiment. An example of the system is the system 100 in FIG. 1, which includes a GPU (e.g., the GPU 110). In one embodiment, the method 500 may be performed by the GPU 110. The method 500 begins at step 510 when the system detects a negative indication with respect to the GPU maintaining a frame rate at an operating frequency. In response to the negative indication, the system at step 520 reduces the frame quality of subsequent frames rendered by the GPU while maintaining the operating frequency of the GPU.

The operations of the flow diagrams of FIGS. 2 and 5 have been described with reference to the exemplary embodiments of FIG. 1. However, it should be understood that the operations of the flow diagrams of FIGS. 2 and 5 can be performed by embodiments of the invention other than the one discussed with reference to FIG. 1, and the embodiment discussed with reference to FIG. 1 can perform operations different than those discussed with reference to the flow diagrams. While the flow diagrams of FIGS. 2 and 5 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system for maintaining a stable frame rate, comprising:
   a graphics processing unit (GPU);
   memory to store frames rendered by the GPU;
   a plurality of performance monitor components to collect a plurality of graphics processing indices, wherein different graphics processing indices indicate amount of loading on different parts of the system; and
   a display to display the frames rendered by the GPU,
   wherein in response to a negative indication with respect to the GPU maintaining a frame rate at an operating frequency, the GPU is operative to determine an operation for reducing frame quality based on whether a predetermined number of the graphics processing indices exceed respective thresholds, and perform the operation to reduce the frame quality of subsequent frames while maintaining the operating frequency.

2. The system of claim 1, wherein the GPU is further operative to reduce GPU loading that leads to a reduction of one or more, and less than all, of the graphics processing indices in the subsequent frames when the one or more of the graphics processing indices exceed the respective thresholds.

3. The system of claim 1, wherein when more than the predetermined number of the graphics processing indices exceed the respective thresholds, the GPU is further operative to reduce resolution of the subsequent frames.

4. The system of claim 1, wherein the GPU is further operative to reduce resolution of at least a subsequent frame that has a high-density content into a rendering region having an adjustable size not greater than a screen size.

5. The system of claim 1, wherein the GPU is further operative to reduce resolution of at least a subsequent frame along a direction of frame content movement.

6. The system of claim 1, wherein the frame quality is reduced by reducing memory data movement and computations of texture filtering in GPU computations.

7. The system of claim 1, wherein the frame quality is reduced by reducing precision of arithmetic logic units (ALUs) in GPU computations.

8. The system of claim 1, wherein the frame quality is reduced by reducing computations of a most-time-consuming task among all tasks executed by the GPU.

9. The system of claim 1, wherein the frame quality is reduced in response to detection of a system condition including at least one of: power saving mode, thermal throttling and sustained performance mode.

10. The system of claim 1, wherein in response to the frame rate being stable and above a threshold, the system is to convert triple buffering of the subsequent frames to double buffering for the display.

11. A method for maintaining a stable frame rate, comprising:
    detecting a negative indication with respect to the GPU maintaining a frame rate at an operating frequency;
    in response to the negative indication, determining an operation for reducing frame quality based on whether a predetermined number of graphics processing indices exceed respective thresholds; and
    reducing the frame quality of subsequent frames by performing the operation while maintaining the operating frequency,
    wherein the graphics processing indices are collected by a plurality of performance monitor components, and wherein different graphics processing indices indicate amount of loading on different parts of the system.

12. The method of claim 11, further comprising:
    reducing GPU loading that leads to a reduction of one or more, and less than all, of the graphics processing indices in the subsequent frames when the one or more graphics processing indices exceed the respective thresholds.

13. The method of claim 11, further comprising:
    reducing resolution of the subsequent frames when more than the predetermined number of the graphics processing indices exceed the respective thresholds.

14. The method of claim 11, wherein reducing the frame quality further comprises:
    rendering at least a subsequent frame that has a high-density content into a rendering region having an adjustable size not greater than a screen size.

15. The method of claim 11, wherein reducing the frame quality further comprises:
    reducing resolution of at least a subsequent frame along a direction of frame content movement.

16. The method of claim 11, wherein reducing the frame quality further comprises:
    reducing memory data movement and computations of texture filtering in GPU computations.

17. The method of claim 11, wherein reducing the frame quality further comprises:
    reducing precision of arithmetic logic units (ALUs) in GPU computations.

18. The method of claim 11, wherein reducing the frame quality further comprises:
    reducing computations of a most-time-consuming task among all tasks executed by the GPU.

19. The method of claim 11, wherein the frame quality is reduced in response to detection of a system condition including at least one of: power saving mode, thermal throttling and sustained performance mode.

20. The method of claim 11, further comprising:
    in response to the frame rate being stable and above a threshold, converting triple buffering of the subsequent frames to double buffering for display.

* * * * *